United States Patent
Buchanan

(10) Patent No.: US 10,501,651 B2
(45) Date of Patent: Dec. 10, 2019

(54) RADIO-OPAQUE 3D PRINTING INK

(71) Applicant: L. Stephen Buchanan, Santa Barbara, CA (US)

(72) Inventor: L. Stephen Buchanan, Santa Barbara, CA (US)

(*) Notice: Subject to any disclaimer, the term of this patent is extended or adjusted under 35 U.S.C. 154(b) by 0 days.

(21) Appl. No.: 15/750,253

(22) PCT Filed: Dec. 5, 2016

(86) PCT No.: PCT/US2016/064973
§ 371 (c)(1),
(2) Date: Feb. 5, 2018

(87) PCT Pub. No.: WO2017/096378
PCT Pub. Date: Jun. 8, 2017

(65) Prior Publication Data
US 2018/0340086 A1  Nov. 29, 2018

Related U.S. Application Data

(60) Provisional application No. 62/262,872, filed on Dec. 3, 2015.

(51) Int. Cl.
C09D 11/38 (2014.01)
C09D 11/10 (2014.01)
C09D 11/322 (2014.01)
B33Y 10/00 (2015.01)
B33Y 70/00 (2015.01)
B33Y 80/00 (2015.01)
B29C 64/112 (2017.01)
G09B 23/28 (2006.01)
G09B 23/30 (2006.01)

(52) U.S. Cl.
CPC ............ C09D 11/38 (2013.01); B29C 64/112 (2017.08); B33Y 10/00 (2014.12); B33Y 70/00 (2014.12); B33Y 80/00 (2014.12); C09D 11/10 (2013.01); G09B 23/28 (2013.01); G09B 23/30 (2013.01)

(58) Field of Classification Search
None
See application file for complete search history.

(56) References Cited

U.S. PATENT DOCUMENTS

| | | | | |
|---|---|---|---|---|
| 9,364,986 | B1* | 6/2016 | Patterson | B33Y 10/00 |
| 2002/0017743 | A1* | 2/2002 | Priedeman, Jr. | B33Y 70/00 264/464 |
| 2003/0203991 | A1* | 10/2003 | Schottman | C08K 3/22 523/334 |
| 2004/0222561 | A1* | 11/2004 | Hopkins | B33Y 10/00 264/308 |
| 2011/0275159 | A1 | 11/2011 | Landgrebe | |
| 2013/0085736 | A1* | 4/2013 | Reihsen | G09B 23/28 703/11 |
| 2015/0209162 | A1* | 7/2015 | Verschueren | B33Y 10/00 623/1.15 |
| 2015/0307728 | A1* | 10/2015 | Omenetto | C09D 11/38 424/649 |
| 2016/0038655 | A1* | 2/2016 | Weisman | B29C 64/112 264/0.5 |
| 2018/0028724 | A1* | 2/2018 | Faccioli | B33Y 10/00 |
| 2019/0001569 | A1* | 1/2019 | Avakian | B33Y 70/00 |

FOREIGN PATENT DOCUMENTS

| | | |
|---|---|---|
| EP | 1837043 A2 | 9/2007 |
| EP | 2526901 A1 | 11/2012 |
| JP | 2015212670 A | 11/2015 |
| JP | 2016165884 A | 9/2016 |
| WO | 2016019078 A1 | 2/2016 |
| WO | WO 2016/019078 A1 * | 2/2016 |

OTHER PUBLICATIONS

"Difference Between Amorphous and Crystalline Polymers", Yashoda, Nov. 2016; https://pediaa.com/difference-between-amorphous-and-crystalline-polymers/; 8 pages.*

Crystalline vs. Amorphous Polymers, Mallard Creek Polymers, Jul. 2017; https://www.mcpolymers.com/library/crystalline-vs.-amorphous-polymers; 5 pages.*

* cited by examiner

*Primary Examiner* — Helene Klemanski
(74) *Attorney, Agent, or Firm* — Gable Gotwals

(57) ABSTRACT

A 3D printing ink comprising a radio-opaque additive and a polymer ink and a method for 3D printing of anatomic replicas using the 3D printing ink are described. The radio-opaque additive is bismuth neodecanoate, and the amount of bismuth neodecanoate in the printing ink may range from about 6% to about 20% by weight. The polymer ink may be transparent or opaque. X-rays of anatomic replicas created with the 3D printing ink appear very similar to x-rays of organic hard tissues, thereby enhancing procedural training for health care professionals.

21 Claims, No Drawings

RADIO-OPAQUE 3D PRINTING INK

CROSS-REFERENCE To RELATED APPLICATIONS

This application is the United States National Phase of Patent Application No. PCT/US2016/064973 filed 5 Dec. 2016, which claims priority to United States Provisional Application No. 62/262,872 filed 3 Dec. 2015, each of which are incorporated herein by reference.

BACKGROUND OF THE INVENTION

This invention relates to inks for use in 3D printers and, more specifically, radio-opaque 3D printing inks.

In the new world of 3D printing seemingly everything is possible. However, like the internet of 20 years ago, the applications of this technology are being worked out day by day to address the specifics of each imagined use. This patent application describes an innovation that furthers the ability to authentically reproduce human anatomy in printed training replicas for health care professionals.

All surgical skills to date have required neophyte surgeons to practice on human patients with oversight from trained colleague preceptors. There are two significant deficits in this method of procedural training. First, the process inescapably involves learning by failures as well as successful clinical outcomes, many times with serious consequences to the patients who have been used in this teaching environment. Second is the severe limitation of a one-on-one requirement to transfer these procedural skills, making it exorbitantly expensive as well as exclusive in the numbers of professionals who are able to acquire these skills.

The advent of multi-ink 3D printers offers an elegant solution to these worldwide problems—the possibility of replicating human anatomy in ways that can authentically mimic the procedural experiences surgeons require to become competent in their fields. Such replicas are advantageous because they reduce patient mortality and morbidity usually attendant to procedural training by taking humans out of the learning process every procedural clinician must go through to achieve competence in their given field of expertise. At the same time, the replicas allow the training of a much larger number of clinicians, thereby reducing the costs and increasing the availability of medical and dental procedures.

As an example, dentistry, specifically endodontics, has been served through the replication of external and internal tooth anatomy—see e.g. U.S. patent application Ser. No. 14/017,225, Anatomic Apparatus and Training System for Remote and Interactive Hands-On Procedural Training for Dentists, hereby incorporated by reference herein—by way of 3D printing. 3D printing is uniquely capable of reproducing the nuances of root canal morphology, a process that injection molding cannot adequately accomplish as there is no way to recreate the microscopic and often tortuous anatomy inside of human and animal teeth.

However, as closely as 3D printing with ultraviolet ("UV")-cured polymers is able to reproduce hard tissue anatomy, before now these anatomic replicas have had very different properties than human hard tissue in their radio-opacity. While clinicians can gain skills by directly viewing the action of instruments and filling materials within root canal spaces, the final connection of that experience to real life clinical situations has been hampered by the nearly radio-lucent nature of the polymer inks used in their printing. There is a need for anatomic replicas that mimic organic hard tissue when subject to X-ray imaging.

SUMMARY OF THE INVENTION

A 3D printing ink comprising a radio-opaque additive and a polymer ink is described. The radio-opaque additive is bismuth neodecanoate, and the amount of bismuth neodecanoate in the 3D printing ink may range from about 6% to about 20% by weight. The polymer ink may be transparent or opaque. A method for 3D printing of an anatomic replica using the 3D printing ink is also described. X-rays of anatomic replicas created with the 3D printing ink appear very similar to x-rays of organic hard tissues, thereby enhancing procedural training for health care professionals.

DETAILED DESCRIPTION OF THE PREFERRED EMBODIMENTS

This invention offers 3D printed anatomic replication that appears, when exposed to x-ray imaging, very similar to the x-ray imaging of organic hard tissues. The challenge of creating a radio-opaque 3D printing ink is greater than one would initially imagine as the chemical composition must, at the same time, a) not affect the setting or set properties of the polymer ink, b) not obscure the transparent polymer inks used to print clear procedural training replicas, and c) not clog the microscopic printer jets as they disperse the printing ink to build the 3D anatomic replicas.

A radio-opaque 3D printing ink contains a radio-opaque additive and a polymer ink. The polymer ink is vinyl acetate ink, anilide ink, or any other polymer ink that is known in the art. The polymer ink may be transparent or opaque. The radio-opaque additive is bismuth neodecanoate ("Bi-NDE", CAS 34364-26-6, $Bi(C_{10}H_{19}O_2)_3$). Bi-NDE is an organometallic compound commercially available in liquid form from sources such as Sigma-Aldrich. Bi-NDE, also known as bismuth trineodecanoate and neodecanoic acid bismuth salt, has a refractive index of n20/D 1.479, a boiling point of 300° C., and a density of 1.145 g/mL at 25° C.

Bi-NDE is an ideal radio-opacifier in polymer inks, preferably UV-cured polymer inks, due to the following properties:

1. Bi-NDE, when added in a range of about 6% to about 20% by weight to a polymer ink such as vinyl acetate ink or anilide ink, does not significantly affect the hardness or heat resistance of the printed replicas;
2. Bi-NDE is a clear, syrup-like solution; and
3. Bi-NDE, while relatively thick in consistency, disburses through the microjet printing block ports of ink-jet printers without inordinately clogging the jets.

Table 1 discloses embodiments of a radio-opaque 3D printing ink that has a Bi-NDE content ranging from about 6% to about 20% by weight and by volume.

TABLE 1

|  | g | % wgt. | mL | % vol. |
| --- | --- | --- | --- | --- |
| Bi-NDE | 250 | 6.67 | 218.34 | 5.48 |
| Vinyl Acetate | 3500 | 93.33 | 3763.44 | 94.52 |
| Total | 3750 | 100.00 | 3981.78 | 100.00 |
| Bi-NDE | 500 | 12.50 | 436.68 | 10.40 |
| Vinyl Acetate | 3500 | 87.50 | 3763.44 | 89.60 |
| Total | 4000 | 100.00 | 4200.12 | 100.00 |
| Bi-NDE | 600 | 14.63 | 524.02 | 12.22 |

TABLE 1-continued

|               | g    | % wgt. | mL      | % vol. |
|---------------|------|--------|---------|--------|
| Vinyl Acetate | 3500 | 85.37  | 3763.44 | 87.78  |
|               |      |        |         |        |
| Total         | 4100 | 100.00 | 4287.46 | 100.00 |
| Bi-NDE        | 700  | 16.67  | 611.35  | 13.97  |
| Vinyl Acetate | 3500 | 83.33  | 3763.44 | 86.03  |
|               |      |        |         |        |
| Total         | 4200 | 100.00 | 4374.79 | 100.00 |
| Bi-NDE        | 800  | 18.60  | 698.69  | 15.66  |
| Vinyl Acetate | 3500 | 81.40  | 3763.44 | 84.34  |
|               |      |        |         |        |
| Total         | 4300 | 100.00 | 4462.13 | 100.00 |
| Bi-NDE        | 900  | 20.45  | 786.03  | 17.28  |
| Vinyl Acetate | 3500 | 79.55  | 3763.44 | 82.72  |
|               |      |        |         |        |
| Total         | 4400 | 100.00 | 4549.47 | 100.00 |
| Bi-NDE        | 1000 | 22.22  | 873.36  | 18.84  |
| Vinyl Acetate | 3500 | 77.78  | 3763.44 | 81.16  |
|               |      |        |         |        |
| Total         | 4500 | 100.00 | 4636.8  | 100.00 |
| Bi-NDE        | 1100 | 23.91  | 960.7   | 20.34  |
| Vinyl Acetate | 3500 | 76.09  | 3763.44 | 79.66  |
|               |      |        |         |        |
| Total         | 4600 | 100.00 | 4724.14 | 100.00 |

Experimentation shows that less than 6% Bi-NDE in the radio-opaque 3D printing ink by weight does not provide sufficient radio-opaque properties for the anatomic replicas to mimic organic hard tissue upon X-ray. Experimentation also shows that more than 20% Bi-NDE in the printing ink causes the jets of the printer to clog too frequently, with cleaning required during each printing cycle. Approximately 12% Bi-NDE by weight seems to strike a good balance between the amount of radio-opacity provided and good printing performance. Ideally, the printer jets should be cleaned about halfway through the printing cycle.

While 3D printing inks containing a radio-opaque additive have been described with a certain degree of particularity, many changes may be made in the composition of the ink and the methods of using it without departing from the spirit and scope of this disclosure. The invention, therefore, is limited only by the scope of the attached claims, including the full range of equivalency to which each element thereof is entitled.

What is claimed is:

1. A 3D printing ink comprising a radio-opaque additive and a transparent polymer ink, wherein the radio-opaque additive is bismuth neodecanoate, in a range of about 6% to about 20% by weight.

2. A 3D printing ink according to claim 1, wherein the 3D printing ink contains about 12% bismuth neodecanoate by weight.

3. A method for 3D printing of an anatomic replica using a 3D printing ink comprising a radio-opaque additive and a polymer ink, the radio-opaque additive including bismuth neodecanoate.

4. A method according to claim 3, wherein the 3D printing ink contains bismuth neodecanoate in a range of about 6% to about 20% by weight.

5. A method according to claim 3 wherein the polymer ink is transparent.

6. A method according to claim 3 wherein the polymer ink is opaque.

7. A 3D printing ink comprising a radio-opaque additive and a polymer ink, wherein the radio-opaque additive contains bismuth neodecanoate in a range of about 6% to about 20% by weight.

8. A 3D printing ink according to claim 7, wherein the 3D printing ink contains about 12% bismuth neodecanoate by weight.

9. A 3D printing ink according to claim 7, wherein the polymer ink is transparent.

10. A 3D printing ink according to claim 7, wherein the polymer ink is opaque.

11. A 3D printing ink comprising a radio-opaque additive and opaque polymer ink, wherein the radio-opaque additive is bismuth neodecanoate in a range of about 6% to about 20% by weight.

12. A 3D printing ink according to claim 11, wherein the 3D printing ink contains about 12% bismuth neodecanoate by weight.

13. A 3D printing ink comprising:
a radio-opaque additive including bismuth neodecanoate; and
a polymer ink.

14. The 3D printing ink of claim 13 wherein bismuth neodecanoate is 6% to 12% by weight.

15. The 3D printing ink of claim 13 wherein bismuth neodecanoate is 12% to 20% by weight.

16. The 3D printing ink of claim 13 wherein the polymer ink is selected from the group consisting of transparent polymer ink and opaque polymer ink.

17. A 3D printed anatomic replica comprising:
a radio-opaque additive including bismuth neodecanoate; and
a polymer ink.

18. The 3D printed anatomic replica of claim 17 wherein the bismuth neodecanoate is 6% to 20% by weight.

19. The 3D printed anatomic replica of claim 17, wherein the bismuth neodecanoate is in a range of 6% to 12% by weight.

20. The 3D printed anatomic replica of claim 17, wherein the bismuth neodecanoate is in a range of 12% to 20% by weight.

21. The 3D printed anatomic replica of claim 17, the polymer ink is selected from the group consisting of transparent polymer ink and opaque polymer ink.

* * * * *